E. E. DROWNS.
REVERSIBLE TAP AND DIE HOLDER.
APPLICATION FILED MAY 25, 1920.
1,401,594.
Patented Dec. 27, 1921.
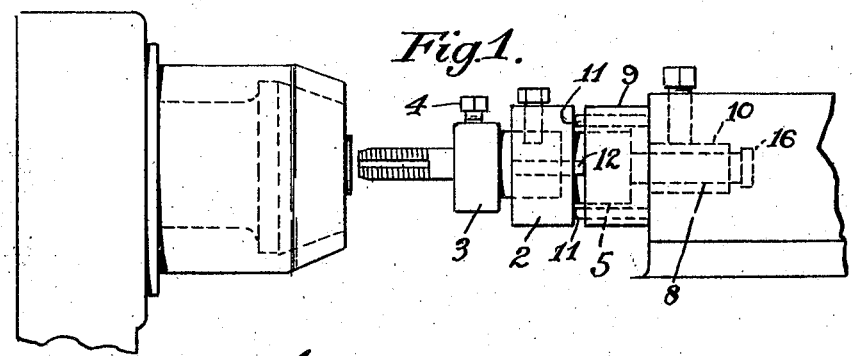
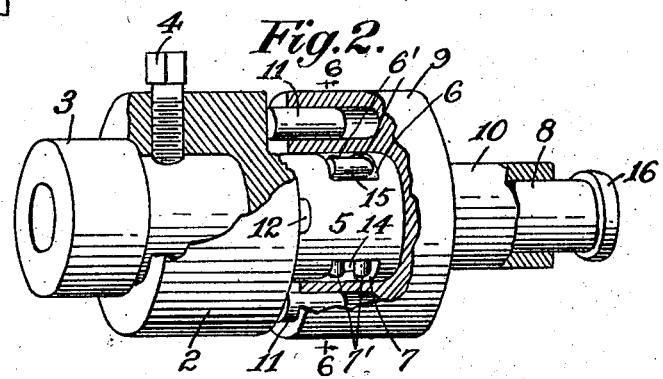
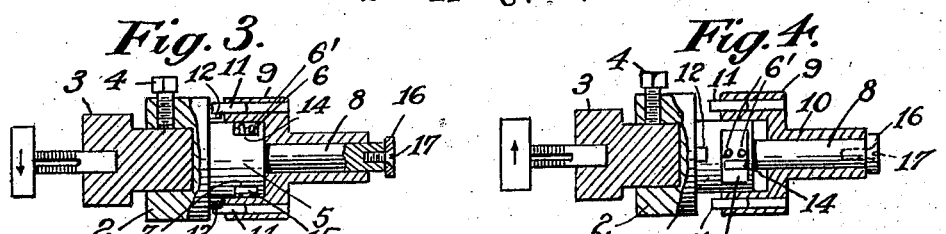
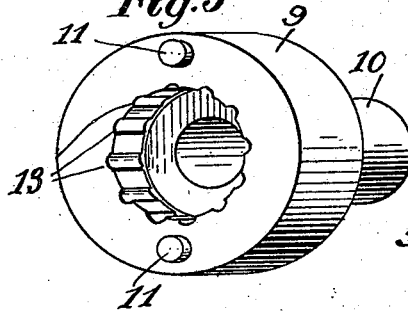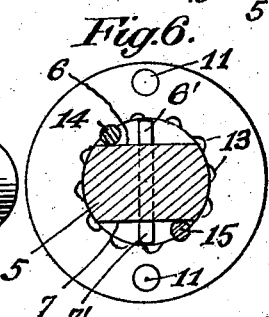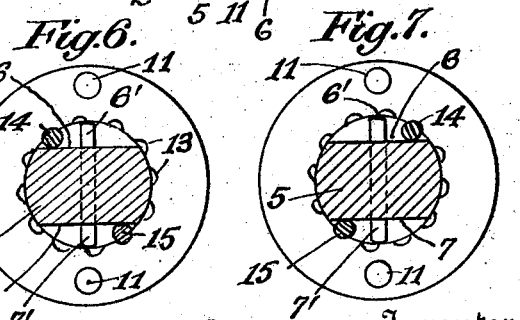
Inventor
Edmund E. Drowns
By his Attorney

UNITED STATES PATENT OFFICE.

EDMOND E. DROWNS, OF CLEVELAND, OHIO, ASSIGNOR TO THE NATIONAL ACME COMPANY, OF CLEVELAND, OHIO, A CORPORATION OF OHIO.

REVERSIBLE TAP AND DIE HOLDER.

1,401,594. Specification of Letters Patent. Patented Dec. 27, 1921.

Application filed May 25, 1920. Serial No. 384,075.

*To all whom it may concern:*

Be it known that I, EDMOND E. DROWNS, a citizen of the United States, residing at Cleveland, in the county of Cuyahoga and State of Ohio, have invented certain new and useful Improvements in Reversible Tap and Die Holders, of which the following is a specification.

The present improvement has to do with reversible tap and die holders, the object of the invention being to provide a simple, effective and easily operated holder of this kind wherein the use of knock-off pins heretofore essential for releasing the tap or die from the work when the work was reversed are dispensed with, so that damage to the holder and breakage of the tap or die due to shock is eliminated whereby a longer-lived and much more efficient holder is provided.

In the drawings accompanying and forming a part of this specification, Figure 1 illustrates in a general way the work spindle and the tap or die turret with this improved tap or die holder attached thereto and carrying in the present instance a tap; Fig. 2 is a side partly sectional view of this improved holder; Figs. 3 and 4 are detail sectional views illustrating different positions of the parts of the holder; Fig. 5 is a perspective end view of the rear member of the holder; Figs. 6 and 7 are cross sectional views taken on line 6—6 Fig. 2, Fig. 6 illustrating the position of the locking pins or rollers during the tapping of left hand threads, and Fig. 7 illustrating the same thing during the tapping of right hand threads.

Similar characters of reference indicate corresponding parts in the several figures of the drawings.

This improved tap or die holder comprises a bored holder member proper or body 2 in the bore of which the tap or die holding means 3 is suitably secured by a set screw 4. This member 2 is provided with a rearwardly extending shank 5 provided at opposite diametrical sides with a pair of slabbed-off or recessed portions 6 and 7, in each of which centrally thereof is located a pair of stop pins 6′ and 7′ respectively. Projecting from this shank is a rearwardly extending shank 8 of smaller diameter. Mounted upon the two shanks is a companion member 9 having a bore corresponding with the bore of the large shank portion 5 and a rearwardly extending bored portion or sleeve 10 corresponding with the smaller shank 8 of the member 2. The juxtaposed faces of these two members 2 and 9 are provided with coöperating mating driving pins 11 and 12 whereby when they are in contact both members will rotate together in one direction or the other, and when they are free the member 2 may be reversed. The larger bore of the member 9 is formed with milled circular grooved stations 13 equally spaced apart.

Located in the recesses 6 and 7 to coöperate with the stop pins are a pair of rollers or grip pins 14 and 15, which pins coöperate with the milled circular stations in the bore of the member 9. The two members 2 and 9 are maintained assembled by means of a collar and screw 16 and 17.

In the operation of this improved die or tap holder, when the driving pins 11 and 12 located respectively in the front and rear faces of the two holders 9 and 2 are in engagement obviously the member 2 will be driven by the member 9 by the usual means provided for that purpose. When however, the threading of the work is completed and the forward movement of the threading tool upon the work has ceased the member 2 will continue to follow the threads and will be drawn forward sufficiently to disengage the pins 11 and 12, which regulates the travel of the die or tap. It is only necessary thereupon to reverse the rotating direction of the work in order to disengage the die or tap from the work for the reason that when the work is reversed the two rollers or grip pins 14 and 15 are forced into the grooved stations, thus locking the parts 2 and 9 together so that the part 2 is no longer rotatable independently of the part 9, and therefore the work is allowed to free itself from the tap or die. Thus when the pins 11 and 12 as heretofore pointed out, have been disengaged the member 2 will have a rotary movement independent of the member 9. This is obtained by reason of the fact that the grip pins 14 and 15 will be moved toward the central portion of the recesses 6 into engagement with the stop pins 7′. In this position of the roller or grip pins 14 and 15 the same will ride over the grooves 13 but upon reversing the direction of rotation of the work, the holder or body 2 with shank 5 will be rotated in the opposite direction. Thereupon the pins 14 and 15 will be shifted from contact with the stop pins 6' and 7' toward the outer portions of the recesses 6 to the position illustrated in Figs. 6 and 7. In this position however of the roller or gripping pins 14 and 15 the same will be forced into grooved stations 13, thereby locking the parts 2 and 9 together, and permitting the work to rotate independently of the member 2 and thus release itself automatically from the threading tool. By referring for instance to Fig. 7 it will be readily observed that by rotating member 5 counter-clockwise relatively to member 9 pins 14 and 15 will be forced to the position shown and into the grooved stations. But upon rotating member 5 clockwise relatively to member 9, the pins 14 and 15 will move to engage stop pins 7, and in this position the depth of the recess prevents engagement of the grip pins with the grooved stations.

By placing the grip pins at one side or the other of the stop pins the cutter is in position to cut either right or left hand threads as the case may be. It will be observed that the instant the direction of the work is reversed the work releases itself from the die or tap without any undue shock to the holder whereas in the old style holder which had a driving pin at the rear end of the shank 8 coöperating with a cam-formed portion on the end of the sleeve 10 when the driving pins 11 and 12 became disengaged and the rotation of the work was reversed, the part 9 was carried away or back toward the rear end of the shank 8 thereby to have the cam face formed on the end of the sleeve 10 engage the pin carried by the shank 8, thus locking the two parts together against rotation with the work, so that the work could release itself, which caused a very severe shock to this pin and the cam portion, which shock was transmitted to the die or tap resulting frequently in failure of the old style holder so that in the production of work where an operator tapped or threaded anywhere from 7000 to 8000 pieces a day a properly hardened or tempered die or tap holder was sufficient for only a short time. The present improved holder outlasts the old style at least five hundred per cent. and also eliminates breakage of dies and taps to at least the same amount.

From the foregoing it will be observed that this improved holder comprises two members,—one the member 2 comprising the holder or body proper of one diameter, a shank of a smaller diameter carrying the grip rollers or pins and provided with a shank of still smaller diameter, the portion having the intermediate diameter carrying as stated, the grip rollers or pins while the member 9 likewise has a body portion proper corresponding in diameter to that of the body portion of the member 10 and is provided with a bore adapted to fit the intermediate shank of the member 2, and a rearwardly extending sleeve or bored portion adapted to fit the smaller shank of the member 2, and that between the intermediate shank of the member 2 and the body portion of the member 9 is located the coöperating grip pins and grooved surfaces which constitute the locking means for locking the two members 9 and 2 together during the reversal of the member 2.

The various details may be more or less changed without departing from the spirit or scope of the present improvement as defined in the claims.

I claim as my invention:

1. A holder for a threading tool comprising a pair of body members having coöperating driving pins, said body members having one a shank and the other a bore fitting thereon, and having between the same roller grip pins, the driving pins being effective to rotate the members together in one direction and the grip pins being effective to lock the members on the reversal of one member relatively to the other.

2. A holder for a threading tool comprising a pair of body members having coöperating driving pins, said body members having one a shank and the other a bore fitting thereon, and having between the same roller grip pins, said body members also having one a rearwardly extending shank and the other a sleeve fitting thereon, the driving pins being effective to rotate the members together in one direction and the grip pins being effective to lock the members on the reversal of one member relatively to the other.

3. A holder for a threading tool comprising a pair of body members of the same diameter, having coöperating driving pins for rotating one member from the other, said body members having one a shank and the other a bore fitting thereon, and having between the same roller grip pins effective on the reversal of one of said members to lock the two of them together.

4. A holder for a threading tool comprising a pair of members having coöperating driving means for operating one member from the other, said members having between certain of their juxtaposed faces shiftable gripping means effective upon reversing the direction of rotation of one of said members relatively to the other, to lock the two together.

5. A holder for a threading tool comprising a pair of body members having coöperating driving pins effective to drive one member from the other in one direction, said body members having one a rearwardly extending shank provided with oppositely located recesses having a centrally located pin in each of said recesses and the other body member having a bore fitting said shank and provided with a series of grooved stations, rollers located in said recesses of the shank and adapted to co-act with the pins and grooved stations and effective to lock the two members together on the reversal of one of them.

6. A holder for a threading tool comprising a pair of body members having coöperating driving pins effective to drive one member from the other in one direction, said body members having one a rearwardly extending shank provided with oppositely located recesses having a centrally located pin in each of said recesses and the other body member having a bore fitting said shank and provided with a series of grooved stations, changeable rollers located in said recesses of the shank and adapted to co-act with the pins and grooved stations and effective to lock the two members together on the reversal of one of them.

7. A holder for a threading tool comprising a pair of body members having coöperating driving pins in their juxtaposed faces, one of said body members comprising a body portion of one diameter, a shank of smaller diameter and a shank of still smaller diameter and the other body portion having a bore adapted to receive the shank of larger diameter, and a bore adapted to receive the shank of smaller diameter, and means carried by one of said shanks and coöperating with the bore of the other body member for locking said members together on the reversal of one of said body members.

8. A holder for a threading tool comprising a pair of body members having coöperating driving pins in their juxtaposed faces, one of said body members comprising a body portion of one diameter, a shank of smaller diameter and a shank of still smaller diameter and the other body portion having a bore adapted to receive the shank of larger diameter and a bore adapted to receive a shank of smaller diameter, means carried by one of said shanks and coöperating with the bore of the other body member for locking said members together on the reversal of one of said body members and comprising one or more stop pins, and a gripping roller.

9. A holder for a threading tool comprising a pair of body members having coöperating driving pins in their juxtaposed faces, one of said body members comprising a body portion of one diameter, a shank of smaller diameter and a shank of still smaller diameter and the other body portion having a bore adapted to receive the shank of larger diameter, and a bore adapted to receive the shank of smaller diameter, means carried by one of said shanks and coöperating with the bore of the other body member for locking said members together on the reversal of one of said body members and comprising one or more stop pins, and a removable and changeable gripping roller.

10. A holder for a threading tool comprising a pair of body members having coöperating driving pins in their justaposed faces, one of said body members comprising a body portion of one diameter, a shank of smaller diameter and a shank of still smaller diameter, and the other body portion having a bore adapted to receive the shank of larger diameter and a bore adapted to receive the shank of smaller diameter, and means carried by the shank of larger diameter and coöperating with the bore of the other member having the largest diameter for locking said members together on the reversal of one of them.

11. A holder for a threading tool comprising a pair of body members having coöperating driving pins in their juxtaposed faces, one of said body members comprising a body portion of one diameter, a shank of smaller diameter and a shank of still smaller diameter and the other body portion having a bore adapted to receive the shank of larger diameter and a bore adapted to receive the shank of smaller diameter, means carried by the shank of larger diameter and coöperating with the bore of the other member having the largest diameter for locking said members together on the reversal of one of them, said means comprising grooved portions in the bore of one member and stop pins and gripping rollers carried by the shank of the other member.

12. A holder for a threading tool comprising a pair of body members having coöperating driving pins in their juxtaposed faces, one of said body members comprising a body portion of one diameter, a shank of smaller diameter and a shank of still smaller diameter and the other body portion having a bore adapted to receive the shank of larger diameter and a bore adapted to receive the shank of smaller diameter, means carried by the shank of larger diameter and coöperating with the bore of the other member having the largest diameter for locking said members together on the reversal of one of them, said means comprising grooved portions in the bore of one member and stop pins and gripping rollers carried by the shank of the other member, said pins being oppositely located and the rollers being changeable to either side of said pins.

13. A holder for a threading tool comprising a pair of body members having coöperating driving pins in their juxtaposed faces, one of said body members comprising a body portion of one diameter, a shank of smaller diameter and a shank of still smaller diameter and the other body portion having a bore adapted to receive the shank of larger diameter and a bore adapted to receive the shank of smaller diameter, said larger shank having oppositely located recesses, centrally located pins therein, and changeable grip rollers located in said recesses, said larger bore having grooved stations coöperating with said grip rollers on the reversal of one of said members relatively to the other.

14. A holder for a threading tool comprising a pair of body members having coöperating driving means, said body members having one a shank and the other a bore fitting thereon, and means located solely between the shank and the wall of the bore of said two body members for locking them together by the reversal of one of said body members relatively to the other.

15. A holder for a threading tool comprising a pair of body members having coöperating driving means, said body members having one a shank and the other a bore fitting thereon, and means located between the shank and the wall of the bore of said two body members for locking them together on the reversal of one of said body members rfelatively to the other and comprising changeable rolls whereby on changing the rolls from one position to another the members may be locked together when one member is reversed either to the right or to the left.

16. A holder for a threading tool comprising a pair of members having coöperating driving means for driving the members in one direction, one member having a part fitting a part of the other member, and locking means located solely within and between said fitting parts for locking said members together by the reversal of one of said parts relatively to the other.

17. A holder for a threading tool comprising a pair of members having coöperating driving means for driving the members in one direction, one member having a part fitting a part of the other member, and locking means located within and between said fitting parts for locking said members together by the reversal of one of said parts relatively to the other and comprising gripping rolls.

18. A holder for a threading tool comprising a pair of members having coöperating driving means for driving the members in one direction, one member having a part fitting a part of the other member, and locking means located within and between said fitting parts for locking said members together by the reversal of one of said parts relatively to the other and comprising gripping rolls, sand gripping rolls being changeable from one position to another whereby the members may be locked on the reversal of one of them either to the right or to the left.

Signed at Cleveland, in the county of Cuyahoga and State of Ohio, this 21st day of May, 1920.

EDMOND E. DROWNS.